May 1, 1962     S. A. JONES     3,032,361
ROAD SANDING DEVICE FOR AUTOMOTIVE VEHICLES
Filed Sept. 25, 1958     2 Sheets-Sheet 1
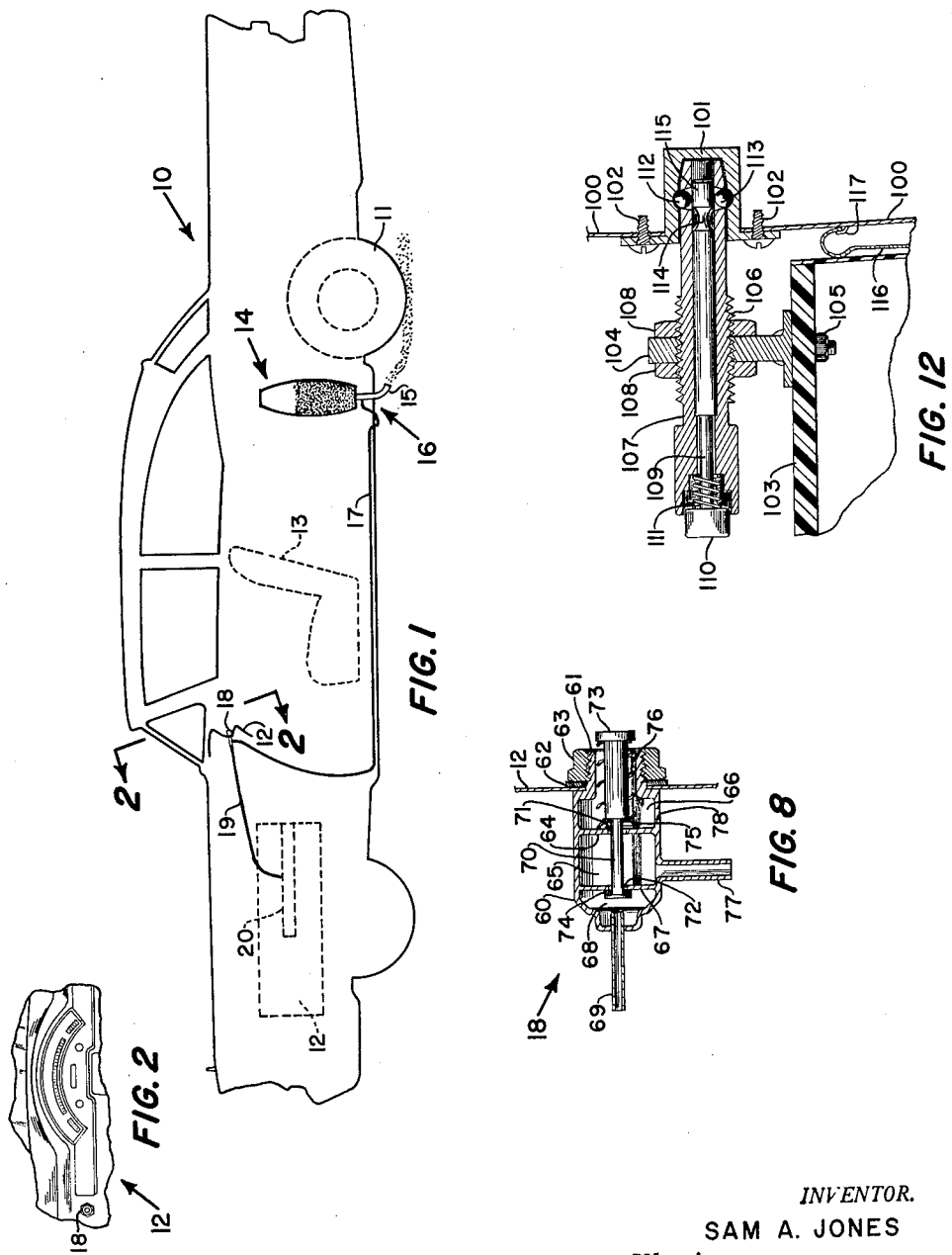
INVENTOR.
SAM A. JONES
BY *Harry B. Keck*
ATTORNEY

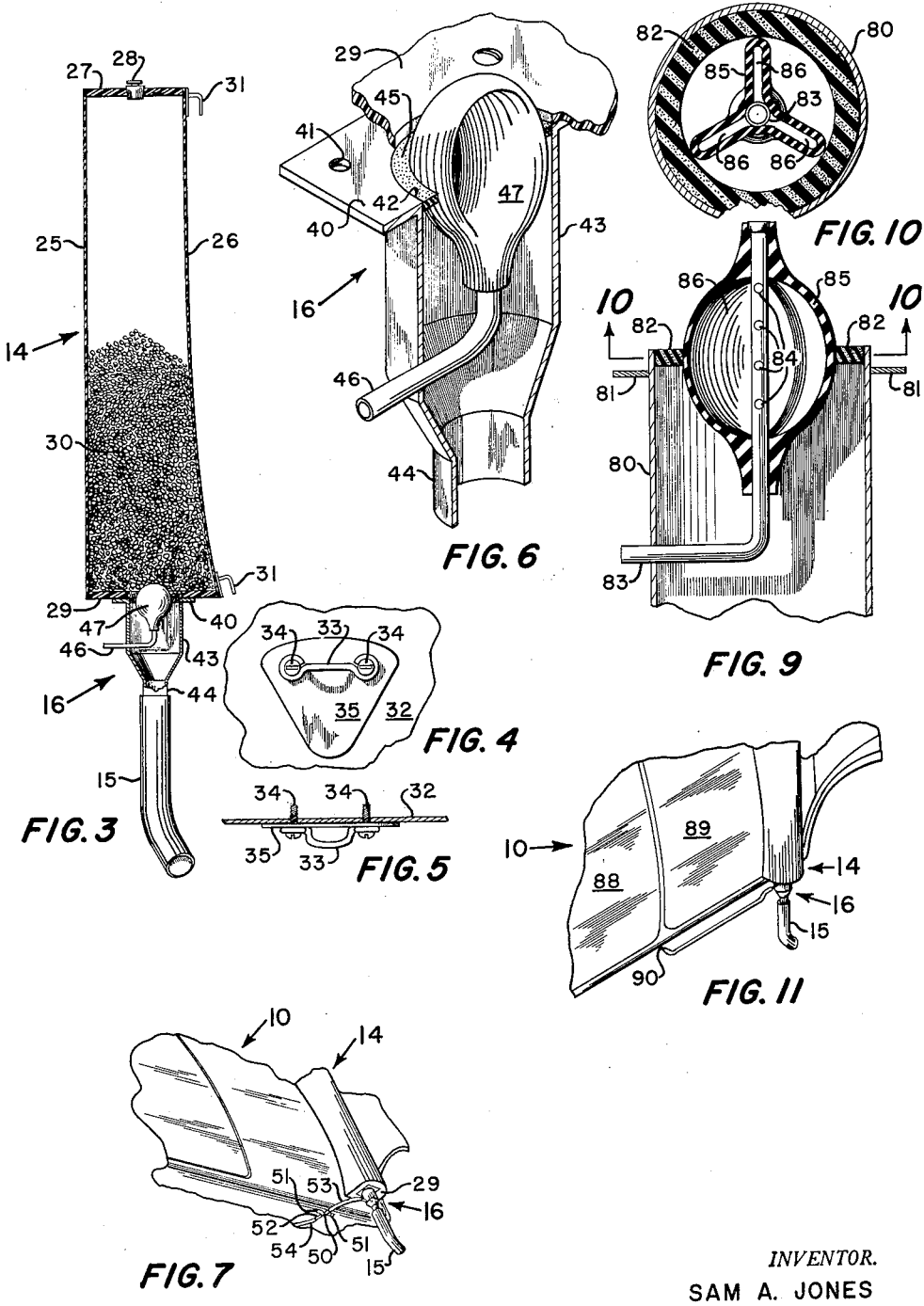

United States Patent Office 3,032,361
Patented May 1, 1962

3,032,361
ROAD SANDING DEVICE FOR AUTOMOTIVE
VEHICLES
Sam A. Jones, Pittsburgh, Pa.
(935 S. Pennsylvania, Lakeland, Fla.)
Filed Sept. 25, 1958, Ser. No. 763,242
2 Claims. (Cl. 291—25)

The present invention relates to apparatus for depositing abrasive solids on roadway surfaces in advance of traction wheels of wheeled vehicles.

Such apparatus commonly called "sanding devices" or "road sanders" have been in use on automobiles, trucks, busses and the like. Such apparatus in the past has been permanently mounted on or in the vehicle. For automobiles, the apparatus has been mounted with the rear trunk compartment. The apparatus has included one or two containers for the abrasive solids and a discharge tube leading downwardly therefrom to permit gravity flow of the abrasive solids for distribution in advance of the rear traction wheel of the automobile. A normally closed solenoid operated valve has been provided in each discharge tube. A control switch for energizing the solenoid operated valve has been mounted in the driver's compartment of the automobile to permit the driver to open the solenoid operated valve to allow abrasive solids to pass through the discharge tube when needed.

Such apparatus has been objectionable for several reasons. Solenoid operated valves have a tendency to freeze in cold weather as a result of moisture accumulation. The container or containers for the abrasive solids occupies valuable trunk compartment space throughout the year, although the device normally is in demand only in the cold weather months. Mounting of the apparatus has required drilling of holes through the undersurface of the vehicle. Replacement of the abrasive solids withdrawn from the container has been a cumbersome chore frequently resulting in spillage of abrasive solids in the trunk compartment. Installation expenses for mounting such apparatus have represented a substantial amount in comparison with the cost of the component parts.

According to the present invention I have provided a road sander for automotive vehicles which can be detachably mounted on the outer lateral surface thereof quickly and easily. The detachably mounted assembly can be carried internally of the vehicle when not in use. When mounted on an automotive vehicle, the apparatus has only a slight outward lateral extension. By providing detachable external mounting, the cost of installation is greatly reduced; the apparatus can be detached quickly and hence does not occupy valuable trunk compartment space; the exhausted inventory of abrasive solids can be replenished without spillage of the abrasive solids inside the vehicle.

In the preferred embodiment of this invention, the flow of abrasive solids from the detachably mounted container is controlled by a novel, vacuum operated, normally closed valve which can be operated by the driver of the vehicle in the driver's compartment. The valve is actuated by applying to it the reduced pressure from the exhaust manifold of the internal combustion engine of the vehicle.

Thus the object of this invention is to provide an externally, detachably mounted apparatus for depositing abrasive solids on roadway surfaces in advance of traction wheels of wheeled vehicles.

A further object is to provide detachable mounting of the described apparatus.

A further object is to provide a road sander having a discharge tube for abrasive solids controlled by a vacuum operated, normally closed valve.

These and other objects of the present invention will be apparent from the following detailed description with reference to the accompanying drawings in which:

FIGURE 1 is a side-elevation outline of a typical automobile illustrating an externally mounted container for abrasive solids according to the preferred embodiment of this invention;

FIGURE 2 is a plan view of the control panel of a typical automobile taken along the line 2—2 of FIGURE 1, illustrating valve operating means;

FIGURE 3 is a cross-section illustration of a detachably mountable container, valve means and discharge tube according to the preferred embodiment of this invention;

FIGURES 4 and 5 are plan and side-elevation views respectively of mounting brackets for detachable mounting of the device of this invention;

FIGURE 6 is a perspective cut-away drawing of a vacuum operated valve means according to the preferred embodiment of this invention;

FIGURE 7 is a perspective cut-away illustration of the device of this invention mounted on the side of an automotive vehicle;

FIGURE 8 is a cross-section illustration of valve operating means suitable for use in the present invention;

FIGURES 9 and 10 are illustrations in side elevation and plan view respectively of an alternative embodiment of the vacuum operated valve means of this invention;

FIGURE 11 is a perspective cut-away drawing of the present device mounted on the side of an automotive vehicle having two lateral doors; and FGURE 12 is a cross-section fragmentary illustration of alternative detachable mounting means suitable for use in the present invention.

Referring to FIGURE 1, a typical automotive vehicle 10 having rear traction wheels 11 is illustrated in outline. An internal combustion engine 12 is shown at the forward end of the vehicle 10. An instrument panel 12 is mounted in the driver's compartment in front of a driver's seat 13. The instrument panel 12 is shown in fragmentary detail in FIGURE 2 which is taken along the line 2—2 of FIGURE 1. A container 14 for abrasive solids is detachably mounted on the side of the vehicle 10 forwardly of the rear traction wheel 11. A discharge tube 15 extends downwardly from the container 14 and inwardly in front of the rear traction wheel 11 to conduct abrasive solids from the container 14 in advance of the rear traction wheel 11.

Valve means 16 are provided to retain abrasive solids in the container 14 except when energized to allow abrasive solids to flow outwardly from the container through the discharge tube 15 at a rate, predetermined by the geometry of the system. A connecting tube 17 extends from the valve means 16 to a manually operated vacuum control means 18 mounted on the instrument panel 12. A vacuum tube 19 extends from the manually operated vacuum control means 18 to an exhaust manifold 20 of the internal combustion engine 12.

Under normal operating conditions, i.e., when the vehicle is operated on dry, non-slippery road surfaces, abrasive solids are not required to maintain traction. The valve means 16 is maintained in a closed position during such normal operating conditions. When the vehicle encounters slippery road surfaces, the vehicle driver operates the manually-operated vacuum control means 18 which allows the sub-atmospheric pressure condition within the exhaust manifold 20 to withdraw the normal atmospheric pressure from the connecting tube 17 and the valve means 16 to cause the latter to open and allow abrasive solids to flow through the discharge tube 15. By thus depositing a quantity of abrasive solids on the roadway in advance of the rear traction wheel 11, slipperiness of the surface is overcome and traction can be maintained.

The detachably mounted apparatus of this invention is illustrated in greater detail in FIGURE 3 which is a cross-section view taken along the center line of the container 14, showing the container 14, the discharge tube 15 and the valve means 16.

The container 14 includes an outboard sidewall 25 and an inboard side wall 26 which is comformable to the curvature of the vehicle side. A top wall 27 encloses the container and is provided with a detachable plug 28 to admit replenishment of the inventory of abrasive solids. A bottom wall 29 is provided above which an inventory 30 of abrasive solids is confined.

Detachable mounting means are provided on the inboard sidewall 26 of the container 14 to cooperate with corresponding mounting means affixed for this purpose on the side of the automotive vehicle 10. As shown in FIGURE 3, two vertically extending pegs 31 are spaced apart from but secured to the inboard side wall 26. Corresponding peg-receiving members such as illustrated in FIGURES 4 and 5 are mounted on the side of the vehicle 10. A fragment of the vehicle side 32 is shown in FIGURES 4 and 5. A U-shaped peg-receiving member 33 is bolted to the vehicle side 32 by means of self-threading metal screws 34. Preferably a decorative shield 35 is held by the same screws 34 between the U-shaped member 33 and the vehicle side 32. The decorative plate can be of any shape to blend into the design features of the vehicle. The function of the decorative shield 35 is to prevent unsightly scratching of the surface of the vehicle side 32 by the repeated insertions and removals of the pegs 31.

I have found that two peg support points provide secure mounting of the container 14 on the sides of virtually all contemporary automobiles, regardless of their lateral curvature. By constructing the entire container 14 from flexible plastic material such as molded rubber, polyethylene, canvas, and similar yieldable materials, it resists impact, yet readily conforms to the side of the vehicle in a secure manner.

The bottom wall 29 has an aperture for receiving the valve means 16, shown in a cut-away perspective illustration in FIGURE 6. An upper plate 40 is provided with bolt holes 41 for fastening the valve assembly to the bottom wall 29. A circular aperture 42 is provided in the upper plate 40 to correspond to the aperture of the bottom wall 29. A cylindrical valve chamber 43 extends downwardly from the upper plate 40 and tapers into a discharge tube connection 44. Extending radially inwardly from the aperture 42 is a ring of resilient sealing material 45 such as foam rubber, sponge rubber, and like yieldable materials.

An L-shaped rigid tube 46 extends horizontally through the wall of the valve chamber 43 and vertically upwardly at the center of the valve chamber 43. Mounted on the upper vertical position of the rigid tube 46 is a resilient molded-squeeze bulb 47 of rubber or plastic or like materials having a normally circular outer surface which engages the ring 45 of resilient sealing material in radial compression. By application of reduced pressures to the rigid tube 46, atmospheric pressure causes the squeeze-bulb 47 to collapse in the configuration illustrated in FIGURE 6 whereby the squeeze bulb 47 withdraws from the ring 45 of sealing material to provide a channel therebetween for the passage of abrasive solids into the valve chamber 43 and through the discharge tube connection 44.

Upon restoration of atmospheric pressure within the rigid tube 46, the squeeze bulb 47 expands outwardly to its normally circular cross-section configuration in contact with the resilient ring 45. Should any particles of abrasive solids be trapped between the squeeze bulb 47 and the resilient ring 45 during the instant of expansion of the squeeze bulb 47, such particles will depress into the resilient ring 45 but will not interfere with a complete closure of the valve means.

Referring to FIGURE 7, the vacuum connection of the present apparatus is illustrated in a perspective view of a vehicle side and undersurface. A container 14, valve means 16 and a discharge tube 15 are shown mounted to the side on a vehicle 10.

A bracket 50 secured by self-threading metal screws 51 is provided for mounting a length of rigid circular tubing 52 to the undersurface of the vehicle 10. Extending from the outboard end of the rigid tubing 52 is a length of flexible tubing 53 which terminates at the rigid L-shaped tube 46. Extending from the inboard end of the rigid tubing 52 is a length of flexible tubing 54 which terminates at the manually-operated vacuum control means 18 on the instrument panel 12 of the vehicle 10.

The rigid tubing 52, the bracket 50 and the flexible tubing 54 comprise a permanent installation on the vehicle 10. When the apparatus is detached from the vehicle 10, the flexible tube 53 is separated from the rigid tubing 52 and the container 14 is removed from its mounting means on the vehicle's side. To reassemble the apparatus, the container 14 is remounted on the side of the vehicle 10 and the flexible tubing 53 is secured to the rigid tubing 52. The reassembly can be accomplished in a matter of seconds.

It is desirable to provide a small resilient cap of rubber, plastic or the like to fit over the outboard end of the rigid tubing 52 during those periods when the apparatus is detached from the side of the vehicle 10. If desired, mating coupling connections may be provided on the ends of the rigid tubing 52 and the flexible tubing 53.

A detailed cross-section illustration of the manually-operated vacuum control means 18 is presented in FIGURE 8. A chambered casing 60 has a threaded end portion 61 which extends through an opening in the instrument panel 12 for securing the vacuum control means 18 by means of a washer 62 and threaded nut 63. A partition 64 divides the chambered casing 60 into a connecting chamber 65 and an atmospheric chamber 66. A second partition 67 separates the chambered casing 60 between the connecting chamber 65 and a vacuum chamber 68. A vacuum connecting tube 69 extends through the end wall of the chambered casing 60 into the vacuum chamber 68. A plunger rod 70 extends through a central opening 71 in the partition 64 and a central opening 72 in the partition 67, and extends through the threaded end portion 61 to a button 73. A ring 74 of resilient material is provided on the inner end of the rod 70 to engage the partition 67 to prevent atmospheric gases from entering the vacuum chamber 68. A ring 75 of resilient material is provided on the plunger rod 70 to engage the partition 64 when the rod 70 is inwardly depressed to prevent flow of atmospheric gases through the opening 71. A coil spring 76 maintains the plunger rod 70 normally in an outwardly biased position as shown, i.e., with the resilient ring 74 closing the opening 72 and the resilient ring 75 out of contact with the partition 64.

A tubing connection 77 is provided to which a flexible tubing leading to a vacuum operated device may be fastened. An aperture 78 extends through the chambered casing 60 into the atmospheric chamber 66 to maintain that chamber at atmospheric pressure at all times. The vacuum connecting tube 69 is in communication with a sub-atmospheric pressure source such as an exhaust manifold of an internal combustion engine.

In the position illustrated in FIGURE 8, both the atmospheric chamber 66 and the connecting chamber 65 are at atmospheric pressure since the resilient ring 74 provides a gas tight seal against the partition 67, and the opening 71 is unobstructed.

When the button 73 is depressed, the plunger rod 70 advances until the resilient ring 75 is seated against the partition 64; concurrently the resilient ring 74 is moved away from the partition 67 whereby gases at atmospheric pressure from the connecting chamber 65 and the tubing connection 77 pass into the vacuum chamber 68 to the sub-atmospheric pressure source through the vacuum connecting tube 69. Upon release of the button 73, the component parts resume the relative positions shown in FIGURE 8. Opening and closing of the valve means 16 is virtually instantaneously responsive to the opening and closing of the manually-operated vacuum control means 18.

An alternative embodiment of the vacuum-operated valve is illustrated in FIGURES 9 and 10. Referring to FIGURE 9, a cylindrical valve casing 80 of rigid material such as metal or plastic, is provided with a rigid upper fastening plate 81. A ring 82 of resilient material such as foam rubber, sponge rubber, or the like, extends radially inwardly around the upper lip of the valve casing 80. Extending through the valve casing 80 is an L-shaped rigid tube 83 which is positioned upwardly centrally within the valve casing 80. The L-shaped rigid tube 83 is closed at its upper end and is provided with a plurality of perforations 84 over its vertical portion. A double-opening squeeze-bulb 85 having a hollow chamber 86 is fitted over the vertical portion of the rigid tube 83 so that the perforations 84 are entirely within the hollow chamber 86. The double-opening squeeze-bulb 85 is maintained in a fixed position on the rigid tube 83 with respect to vertical movement. The outer surface of the double-opening squeeze-bulb is in peripheral contact with the ring 82 of resilient material to prevent passage of solids downwardly therebetween under normal conditions.

By reducing the pressure of the hollow chamber 86 below atmospheric pressure, the double-opening squeeze bulb 85 is caused to collapse and withdraw from peripheral contact with the resilient ring 82. The collapse is illustrated in FIGURE 10 which is a cross-sectional view taken along the line 10—10 of FIGURE 9. The collapse of the double-opening squeeze-bulb 85 usually occurs in a three-way configuration as depicted in FIGURE 10 to leave three passageways for the flow of solids between the double-opening squeeze-bulb 85 and the resilient ring 82.

The road sanding apparatus of this invention can be adapted to virtually every contemporary automobile. When the automobile is of the 4-door variety, having a front and a rear door on each side, the container may be mounted on the rear door as shown in FIGURE 11. A fragmentary view of the side of a 4-door automobile 10 is shown in FIGURE 11, having a front door 88 and a rear door 89. The container 14 is secured to the rear door 89. A rigid tubing 90 is mounted to the undersurface of the automobile 10 between the doors 88 and 89. A flexible tubing 91 extends tautly from the rigid tubing 90 to the vacuum connection of the valve means 16. In this installation, the rear or door may be opened without interference from the sanding device of this invention.

Normally a sanding device is provided for each of the rear traction wheels by providing detachable mounting means on each side of the vehicle.

Each of the rigid tubing elements which are bracket-mounted to the undersurface of the vehicle may be connected to a separate manually-operated control means in the driver's compartment to provide independent control over the distribution of abrasive solids at each side of the vehicle. Such assembly would prove valuable when only one side traction wheel encounters a slippery road surface. Preferably, however, the two bracket-mounted rigid tubings are both connected to a single manually-operated control means so that abrasive solids are distributed in advance of both traction wheels.

An alternative detachable mounting means for the sanding device is illustrated in FIGURE 12 employing a plug-and-jack assembly instead of the peg and peg-receiving member system already described. One or more jacks are inset in the side of the automobile in positions corresponding to one or more plugs secured to the container for abrasive solids. The plugs are adapted to lock securely within the jacks. As shown in FIGURE 12, a side panel of an automobile 100 is drilled to receive a jack 101 secured to the panel by means of self-threading metal screws 102. A container 103 for abrasive solids according to this invention has a plug supporting bracket 104 secured to it for example by means of a nut and bolt 105. The bracket 104 has a threaded aperture 106 in which a threaded plug 107 may be adjustably secured with lock nuts 108. The plug 107 has a hollow core through which a shaft 109 extends. A button 110 at the outer end of the shaft 109 is resiliently maintained in an outward position by means of a helical spring 111. The configuration of the inner portion of the body of the plug 107 corresponds to the configuration of the inner portion of the jack 101. An annular groove 112 is provided within the jack 101 to receive two or more spherical balls 113 carried within the body of the plug 107. A groove 114 is provided on the shaft 109 to receive the spherical balls 113 carried within the body of the plug 107.

In normal position, the spherical balls 113 extend outwardly through openings in the plug 107 and are maintained in outward extension by virtue of the tip 115 of the shaft 109. By depressing the button 110 against the helical spring 111, the shaft 109 advances to allow the spherical balls 113 to withdraw into the groove 114 whereby the plug 107 may be inserted into or removed from the jack 101. On insertion of the plug 107 into the jack 101, the helical spring 111 presses the button 110 outwardly and the resulting movement of the shaft 109 causes the tip 115 thereof to extend the spherical balls 113 outwardly into a locking engagement with the groove 112.

The "quick-disconnect" plug-and-jack apparatus illustrated in FIGURE 12 provides a secure mounting for the present apparatus on the side of an automotive vehicle.

A further alternative mounting technique (not illustrated) would employ an elastic canvas strap extending upwardly and downwardly from the container 14. The upwardly extending strap is provided with a bracket for insertion into a convenient opening in the vehicle such as the space between the window and door. The downwardly extending strap is provided with a fastening appendage adapted to engage a corresponding fastening means on the vehicle beneath the container.

A further feature of this invention is illustrated in FIGURE 12 by showing that the container 103 of the present invention can be installed on automobiles despite the various decorative metallic strips (usually chrome or aluminum) which are provided thereon. A typical decorative metallic strip 116 is shown in fragmentary cross-section as typically mounted on or in a bracket 117. Because of the resilient nature of the container 103 of this invention, the container will mold itself over a variety of diverse lateral vehicle body configurations.

If desired, of course, the surface of the container which contacts the side of the vehicle may be altered to coincide with the lateral configuration thereof. The container may be constructed of colored plastic, molded rubber, canvas and the like to correspond with the coloring scheme of the vehicle.

The container, together with the valve housing may be molded as a unitary structure from plastic materials such as polyethylene, molded rubber and similar impact-resisting resilient materials.

According to the provisions of the patent statutes, I have explained the principle, preferred construction, and mode of operation of my invention and have illustrated and described what I consider to represent its best embodiment. However, I desire to have it understood that, within the scope of the appended claims, the invention

I claim:

1. In a sander device for an automotive vehicle having traction wheels, a driver's compartment and an internal combustion engine with a vacuum manifold, the improvement comprising a container for abrasive solids detachably mounted on the side of said vehicle forwardly of said traction wheels, a discharge tube extending downwardly from said container forwardly of each of said traction wheels, vacuum-operated, normally closed valve means between said container and said discharge tube, vacuum control means in said driver's compartment, a tubing mounted on the undersurface of said vehicle adjacent to said container, a first connecting tube connecting said vacuum control means to said tubing, a second connecting tube connecting said tubing and said valve means, a vacuum tube connecting said vacuum manifold to said vacuum control means, said connecting tubes normally being in communication with the atmosphere, and alternatively when said vacuum control means is operated, being in communication with the reduced pressure of said vacuum manifold whereby said valve means are caused to open to allow gravity flow of abrasive solids through said discharge tube, said second connecting tube being quickly attachable with and detachable from said tubing whereby the said container, said discharge tube, said valve means and said second connecting tube are quickly attachable with and detachable from the said vehicle as a unitary structure.

2. For use in an automotive vehicle having traction wheels, a driver's compartment and an internal combustion engine with a vacuum manifold, an improved road surface sanding apparatus comprising:

a container for abrasive solids detachably mounted on the side of said vehicle forwardly of said traction wheels;

a discharge tube connected to and extending downwardly from said container forwardly of each of said traction wheels;

vacuum-operated normally closed valve means between said container and said discharge tube;

vacuum control means having a valve chamber in said driver's compartment including a first port communicating with said valve chamber, a second port communicating with said valve chamber when said vacuum control means is actuated, and a third port communicating with the atmosphere and with said valve chamber when said vacuum control means is not actuated;

a tubing rigidly mounted on the undersurface of said vehicle adjacent to said container and having a first end and a second end;

a first connecting tube which connects with said second port of said vacuum control means and said first end of said tubing;

a second connecting tube which connects said second end of said tubing and the said vacuum-operated valve means, said second connecting tube being readily attachable with and detachable from its connection with the said second end of said tubing;

a vacuum tube which connects the said vacuum manifold to said first port of said vacuum control means;

said first and second connecting tubes and said tubing and said vacuum-operated valve means being normally in communication with the atmosphere through the said vacuum-operated valve means when said vacuum control means is not actuated, and being in communication with the reduced pressure of said vacuum manifold through the said valve chamber, the said first port of the said vacuum control means and the said vacuum tube whereby said vacuum-operated valve means is caused to open when said vacuum control means is actuated to allow gravity flow of said abrasive solids downwardly through said vacuum-operated valve and said discharge tube from said container;

whereby the said container, the said discharge tube, said vacuum-operated valve means and the said second connecting tube may be removed as a unitary structure from the said automotive vehicle by separating the said second connecting tube from the said tubing.

References Cited in the file of this patent

UNITED STATES PATENTS

| | | |
|---|---|---|
| 1,380,964 | Hopkins | June 7, 1921 |
| 1,555,153 | Petrus | Sept. 29, 1925 |
| 1,604,168 | Johnson | Oct. 26, 1926 |
| 1,734,276 | Skolnik et al. | Nov. 5, 1929 |
| 2,131,514 | Johnson et al. | Sept. 27, 1938 |
| 2,223,722 | Farrell | Dec. 3, 1940 |
| 2,616,744 | Walford et al. | Nov. 4, 1952 |
| 2,725,988 | Miller | Dec. 6, 1955 |
| 2,752,182 | Marmelstein | June 26, 1956 |